United States Patent
Qazi et al.

(10) Patent No.: US 7,321,567 B2
(45) Date of Patent: Jan. 22, 2008

(54) METHOD AND APPARATUS FOR PREVENTING A SPURIOUS RETRANSMISSION AFTER A PLANNED INTERRUPTION OF COMMUNICATIONS

(75) Inventors: Kamran A. Qazi, Arlington Heights, IL (US); Vijay Kolli, Schaumburg, IL (US); Peter J. Wilhelm, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 862 days.

(21) Appl. No.: 10/675,739

(22) Filed: Sep. 30, 2003

(65) Prior Publication Data
US 2005/0070246 A1 Mar. 31, 2005

(51) Int. Cl.
*H04B 1/06* (2006.01)
(52) U.S. Cl. ............... 370/278; 370/338; 370/328
(58) Field of Classification Search ............ 370/328, 370/338, 474, 278
See application file for complete search history.

(56) References Cited

U.S. PATENT DOCUMENTS 6,262,980 B1 * 7/2001 Leung et al. .............. 370/336
6,909,899 B2 * 6/2005 Wang et al. ............... 455/436
2002/0150048 A1 10/2002 Ha et al.
2004/0052234 A1 * 3/2004 Ameigeiras et al. ....... 370/338
2004/0095935 A1 * 5/2004 Connor ..................... 370/392

OTHER PUBLICATIONS

V. Paxson, "Computing TCP's Retransmission Timer", RFC2988, Internet RFC/STD/FYI/BCP Archives, Nov. 2000.
Yazid Mohamed, et al. Performance of TCP on Mobile IP Network During Handoffs; pp. 390-393; 2002 Student Conf. on Research and Development Proceedings.

* cited by examiner

*Primary Examiner*—Lester G. Kincaid
*Assistant Examiner*—Fred Casca

(57) ABSTRACT

In a wireless communication system (400), a mobile station (404) or a base station (402), or both working together, determine (302) whether a planned interruption in communications is about to occur; and, in response to determining that the planned interruption is about to occur, progressively increase (306) the round-trip time for a plurality of successive data segments sent before the planned interruption occurs, such that a retransmission timeout value calculated by a sender becomes larger than a time required to complete the planned interruption, thereby preventing a spurious retransmission.

20 Claims, 3 Drawing Sheets

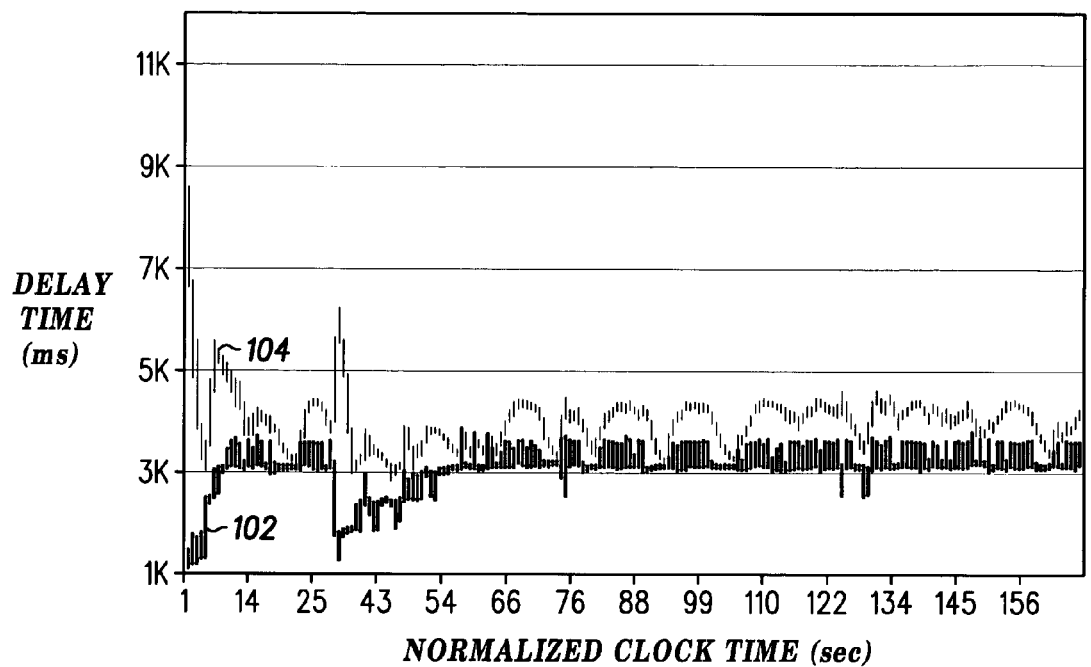
- PRIOR ART -  FIG. 1  100
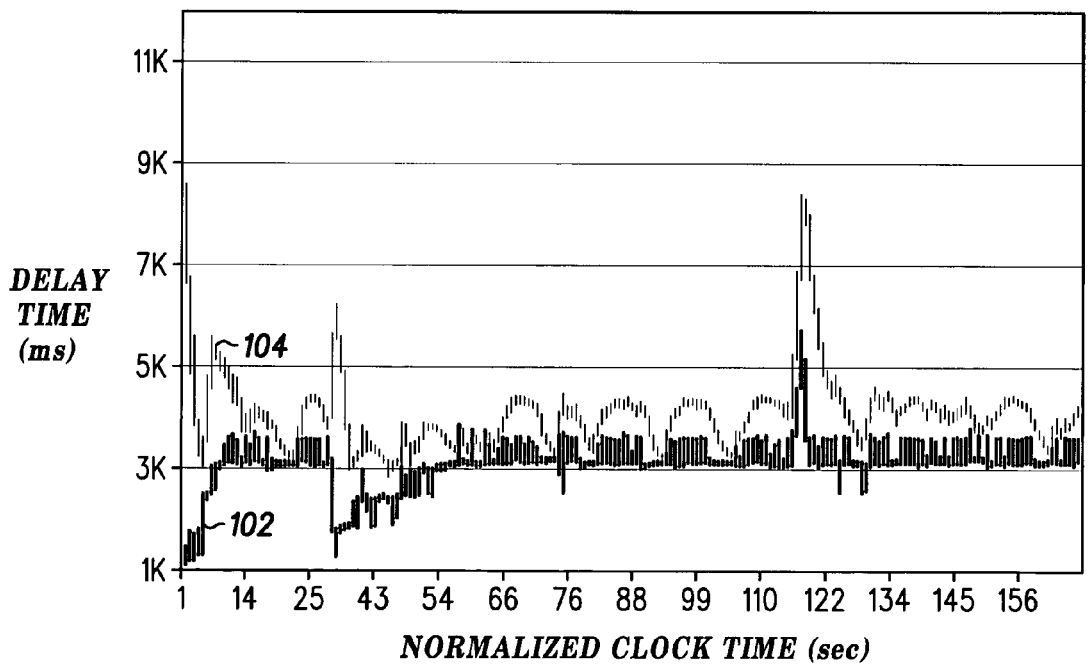
FIG. 2  200

METHOD AND APPARATUS FOR PREVENTING A SPURIOUS RETRANSMISSION AFTER A PLANNED INTERRUPTION OF COMMUNICATIONS

FIELD OF THE INVENTION

This invention relates in general to wireless data communication systems, and more specifically to a method and apparatus for preventing a spurious retransmission after a planned interruption of communications.

BACKGROUND OF THE INVENTION

In a wireless network, a mobile station (MS) may choose to change its serving cell, i.e., radio coverage area of a base station serving the MS, based upon certain criteria, e.g., signal to noise ratio, carrier to interference ratio, block error rate, or for other reasons. This procedure is termed as "Handover", "Handoff", "Cell Change", or "Cell Reselection" in different technologies. Without loosing generality, a cell change may be carried out through an independent decision of the MS or through a decision made by the wireless network in collaboration with the MS. A "hard cell change" occurs when the MS breaks the connection from the serving cell before it establishes a new connection in the target cell. General Packet Radio Service (GPRS) is an example of a technology that utilizes the hard cell change.

During a hard cell change, the mobile station (MS) loses contact with the serving cell. After some time, it establishes a new connection with a target cell. Depending upon the wireless technology, the overall duration that the MS stays disconnected from the network varies. For example, in GPRS the duration is at least two seconds. Due to this temporary outage at the data link layer, the Transmission Control Protocol (TCP) layer may conclude that the in-flight data is lost. TCP's retransmission timeout (RTO) algorithm is designed to handle both lost and delayed data segments the same way; i.e., it does not have the intelligence to distinguish one from the other. After expiration of TCP's retransmission timeout (RTO), TCP retransmits all in-flight data one segment at a time.

In the particular case where the MS is performing a cell change, these retransmissions are bogus and introduce duplicate copies of in-flight data into the network. These retransmissions are termed "spurious" in that the data-in reality-is not lost; it is just extraordinarily delayed. When the MS establishes connection in the target cell, the data buffered at the cell site during the outage is transmitted over the air, in addition to all the data that the TCP sender retransmitted due to the retransmission timeout. This retransmitted data is expensive for a wireless network in terms of poor utilization of airtime, increased buffer occupancy and reduction in overall system performance.

Thus, what is needed is a method and apparatus for preventing a spurious retransmission after a planned interruption of communications, such as a hard cell change.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

FIG. 1 depicts sample traces taken from an FTP file transfer on a prior-art GPRS network.

FIG. 2 depicts sample traces taken from an FTP file transfer on a GPRS network in accordance with the present invention.

DETAILED DESCRIPTION OF THE PREFERRED EMBODIMENTS

Figure 3:
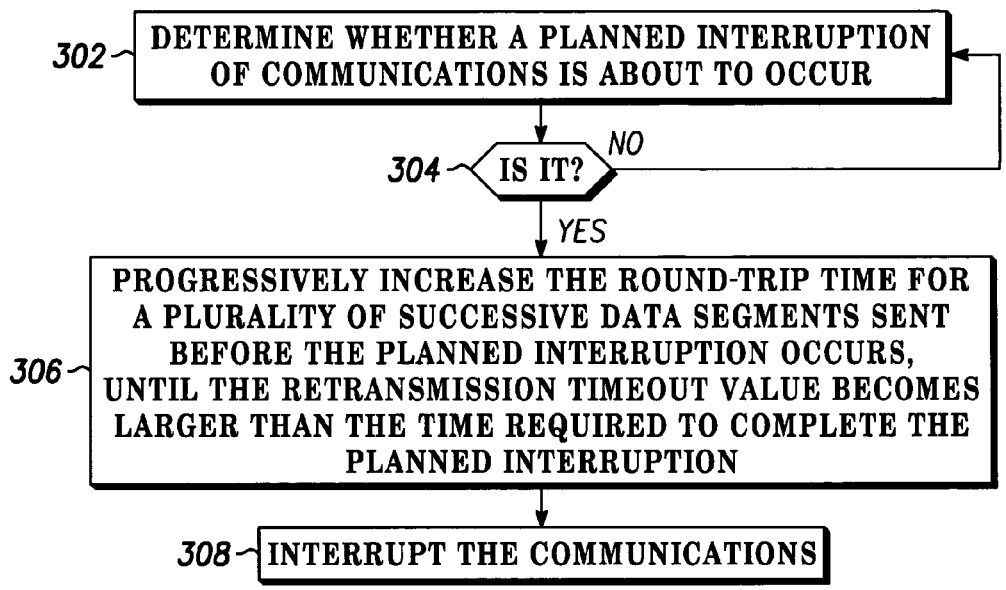
FIG. 3 is a flow diagram depicting a method for preventing a spurious retransmission in accordance with the present invention.

In overview the present disclosure concerns wireless data communications systems that utilize receivers and transmitters to provide service for mobile stations or more specifically for a user thereof operating therein. More particularly, various inventive concepts and principles embodied as a method and apparatus for preventing a spurious retransmission after a planned interruption of communications for use in equipment with such communications systems will be discussed and disclosed. The communications systems of particular interest are those being deployed and developed such as General Packet Radio Service (GPRS), integrated Dispatch Enhanced Network (iDEN)-data, Code Division Multiple Access (CDMA)-packet, Universal Mobile Telecommunications Services (UMTS), and evolutions thereof, although the concepts and principles have application in any wireless LANs utilizing the hard cell change.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional processors, or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such processors, or generating such ICs with minimal experimentation. Therefore, in the interest of brevity and minimization of any risk of obscuring the principles and concepts according to the present invention, further discussion of such processors and ICs, if any, will be limited to the essentials with respect to the principles and concepts employed by the preferred embodiments.

Referring to FIG. 1, sample traces depict an actual FTP file transfer 100 on a prior-art GPRS network. The "clock time" on the horizontal axis signifies the progress of file transfer. Note that it has been normalized for ease of explanation. The "delay time" on vertical axis is represented in milliseconds. The lower trace 102 depicts RTT (round trip time) samples taken by the TCP sender. It is the functional behaviour of TCP's RTO algorithm to compute a retransmission timeout (RTO) value after each RTT sample. The upper trace 104 depicts the computed RTO values.

Please note that initially the delta between RTT and RTO values is usually on the order of 9-10 seconds. This is typical for an initial set of values for a new TCP connection to account for unknown network conditions. In other words, if a segment is lost (or delayed) during this time, TCP sender will not retransmit before at least 9-10 seconds have passed since the time the segment was transmitted first.

As file transfer progresses, the RTO algorithm starts to receive fairly stable RTT samples (after time 66 onwards in FIG. 1). When the RTO algorithm achieves a steady state, the RTO values tend to approach the RTT. In other words, the network itself advises (implicitly) the TCP sender to assume a segment is lost if an acknowledgement is not received within the observed RTT time, plus some "cushion" value for possible jitter. Note that the cushion time is approximately 500 milliseconds in this example.

If the maximum jitter that can withstand the retransmission timeout is on the order of 500 milliseconds and a hard cell change is attempted during this time taking more than two seconds, the TCP sender will timeout and retransmit the first outstanding data segment. Going forward, it will retransmit all the in-flight data upon receipt of successive acknowledgements effectively duplicating the entire in-flight data at the time of cell change. The bottom line is that the RTO algorithm is not designed to absorb long delays due to cell change. The reader is referred to IETF standard RFC2988, November 2000 for further information on the behaviour of the TCP protocol and RTO algorithms.

FIG. 2 depicts sample traces taken from an FTP file transfer 200 on a GPRS network in accordance with the present invention. The idea is to not let the long delay variation happen abruptly. One way this can be done is to artificially swell the delta between RTT and RTO beforehand; a second or two before the mobile station (MS) disconnects from the serving cell. This delta should be on the order of at least 3-5 seconds to account for the temporary disconnect during the hard cell change. (This time is appropriate for GPRS technology; other technologies may have different cell change times and may need to adjust the delta accordingly).

With some prior knowledge that the cell change is going to occur within the next second (or two), the MS or the network may start to progressively delay each successive acknowledgement by about 400 milliseconds, until the MS disconnects from the network to perform the hard cell change. The trick with the RTO is that, it can withstand incremental delays but not an abrupt one. Hence, the RTO algorithm at this stage can easily absorb this negligible delay of about 400 milliseconds without any spurious retransmissions. The RTO algorithm is sensitive enough to pick up these delays and adjust the retransmission timeout exponentially upwards, thus creating enough room for the MS to perform cell change without causing any retransmissions at the TCP layer. Should a cell change be attempted, roughly at around time 117, the MS can stay disconnected for almost 5 seconds to perform cell reselection without causing any retransmissions. The bottom line is that, by progressively delaying the acknowledgements in advance, we are training the RTO values for an even bigger outage, i.e., a hard cell change.

In the example disclosed herein above, it is easy to designate a particular TCP entity as "sender" and another one as "receiver". This is because of the nature of the application being run, i.e., file transfer in this case. However, in other applications running on TCP, it may not always be as easy. Both entities could be termed as "sender" and "receiver". A question may come to mind as to who will implement this "progressive delay" suggested in the previous section?

The answer lies in the self-clocking nature of TCP, meaning that the data or acknowledgement from a receiver triggers the sender to send additional data towards the receiver. This implies that if the data or acknowledgement from the receiver is delayed, the sender will also be delayed in sending the additional data. Due to self-clocking nature of TCP, the "progressive delay" needs to be implemented in one direction only. The segments flying in the other direction will automatically be delayed by the other TCP entity. Since this scheme is generally applicable to wireless networks, it is suggested that the delay is implemented in the "uplink" path from the MS to the base station irrespective of who is the sender or receiver. This is preferred because the MS actively participates in determining whether the cell change is needed, while in some systems the base station does not.

FIG. 3 is a flow diagram 300 depicting a method for preventing a spurious retransmission in a wireless communication system in accordance with certain embodiments. The flow begins with determining 302 whether a planned interruption of communications is about to occur. At step 304 if a planned interruption is not about to occur, the flow returns to step 302 to continue checking. If, on the other hand, at step 304 a planned interruption is about to occur, then the round trip time of communications between the MS and the network is progressively increased 306 for a plurality of data segments sent before the planned interruption occurs. The round trip time preferably is gradually increased until the calculated retransmission timeout value becomes larger than a predetermined time required to complete the planned interruption. Given this increase, the communications advantageously can be interrupted 308 for the predetermined time without causing a spurious retransmission.

It will be appreciated that the round-trip time for each data segment of the plurality of successive data segments preferably is increased by an amount insufficient to exceed the retransmission timeout value when the data segment is sent. It will be further appreciated that the communication protocol used in the wireless communication system preferably is a self-clocking protocol, and that progressively increasing the round-trip time comprises adding a delay in only one direction of the two-way communication channel, for example, by the MS in the uplink direction from the MS to the base station. Equally effective if deemed a more desirable choice, the delay can be added in either the uplink direction or the downlink direction by the base station, when the system operation is such that the base station collaborates with the MS in making the cell change decision. In one embodiment, the communication protocol used in the wireless communication system is the Transmission Control Protocol (TCP), and the round-trip time is progressively increased for each data segment of the plurality of successive data segments by about 400 milliseconds more than that of an immediately previous segment. In the preferred embodiment, the planned interruption of communications is caused by a break-before-make handoff of the MS from a first cell to a second cell. The handoff may be needed for any of several reasons: a signal quality of communications between the MS and the current cell is becoming too low, the system is congested, a better quality of service is needed, or a different bandwidth is needed, to name a few reasons.

Figure 4:
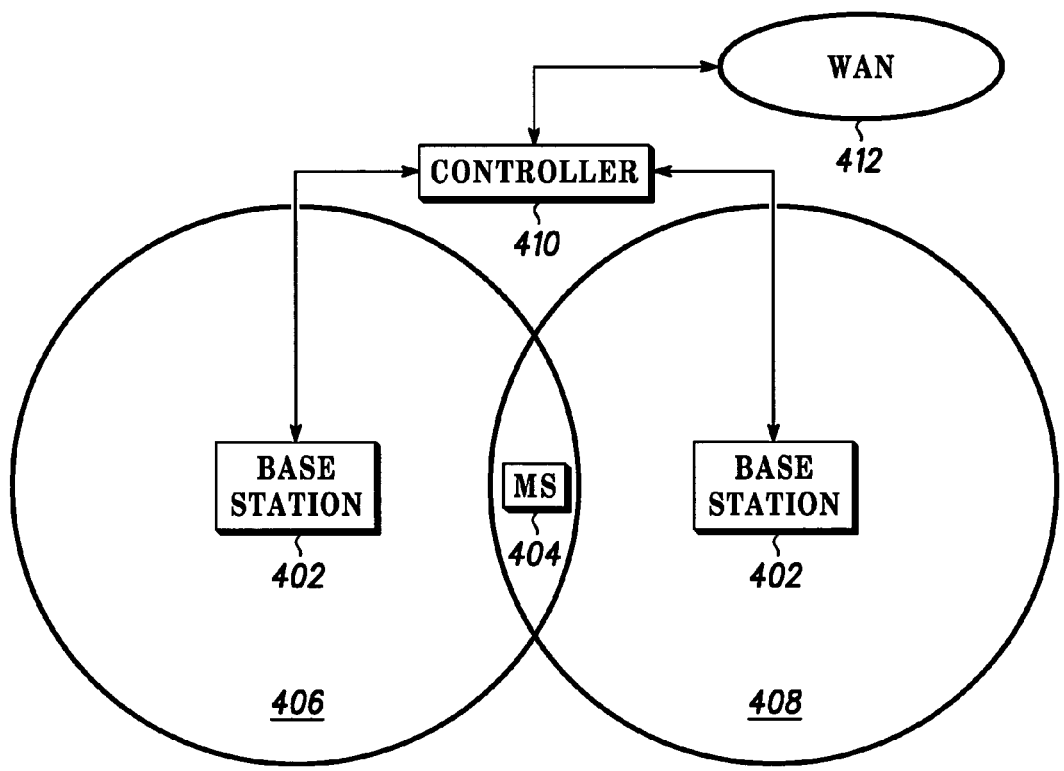
FIG. 4 is an exemplary electrical block diagram of a wireless communication system in accordance with the present invention.

FIG. 4 is an exemplary electrical block diagram of a wireless communication system 400 in accordance with the present invention, comprising at least two base stations 402 for providing wireless communications for at least one mobile station (MS) 404 within at least first and second cells 406, 408. The base stations are coupled to a controller 410 for controlling the wireless communication system 400. The controller 410 is preferably coupled to a wide area network (WAN) 412, such as the Internet for communicating therewith. The MS 404 preferably can perform a handover of communications between the first and second cells 406, 408 through a break-before-make hard cell change. The MS 404 preferably comprises an element for preventing a spurious retransmission during the hard cell change in accordance with the present invention. Alternatively, the base stations 402 can comprise an element for preventing a spurious retransmission during the hard cell change.

Figure 5:
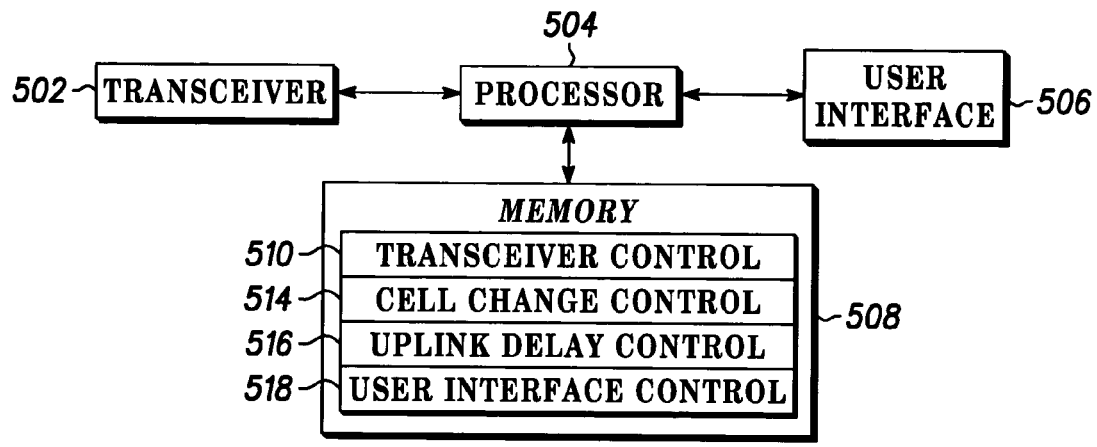
FIG. 5 is an exemplary electrical block diagram of a mobile station (MS) in accordance with the present invention.

FIG. 5 is an exemplary electrical block diagram of the MS 404 in accordance with certain embodiments, comprising a conventional transceiver 502, such as the transceiver utilized in the GPRS mobile stations readily available from Motorola, Inc. and others. The transceiver 502 is coupled to a conventional processor 504, such as a processor of the MC68000 family of processors available from Motorola, Inc., for controlling the transceiver 502. The MS 404 further comprises a user interface 506, e.g., a conventional keypad, display, and audible alert, for interfacing with a user. In addition, the MS 404 includes a conventional memory 508 coupled to the processor 504 and including executable software programs for programming the processor 504.

The memory 508 comprises a conventional transceiver control program 510 for programming the processor 504 to control the transceiver 502 according to the protocol utilized in the wireless communication system 400. The memory 508 also includes a conventional cell change control program 514 for programming the processor 504 to cooperate with the transceiver 502 to execute a cell change through well-known techniques when needed. The cell change can be needed for several reasons: poor signal quality, system congestion, a need for a different quality of service or a different bandwidth, to name a few. In addition, the memory 508 includes an uplink delay control program 516 for programming the processor 504 to progressively and advantageously increase the round trip time for a plurality of data segments sent just prior to the cell change to prevent a spurious retransmission from resulting from the cell change, according to some embodiments. The memory 508 further comprises a conventional user interface control program 518 for programming the processor 504 to interact with the user interface 506 through known techniques.

Figure 6:
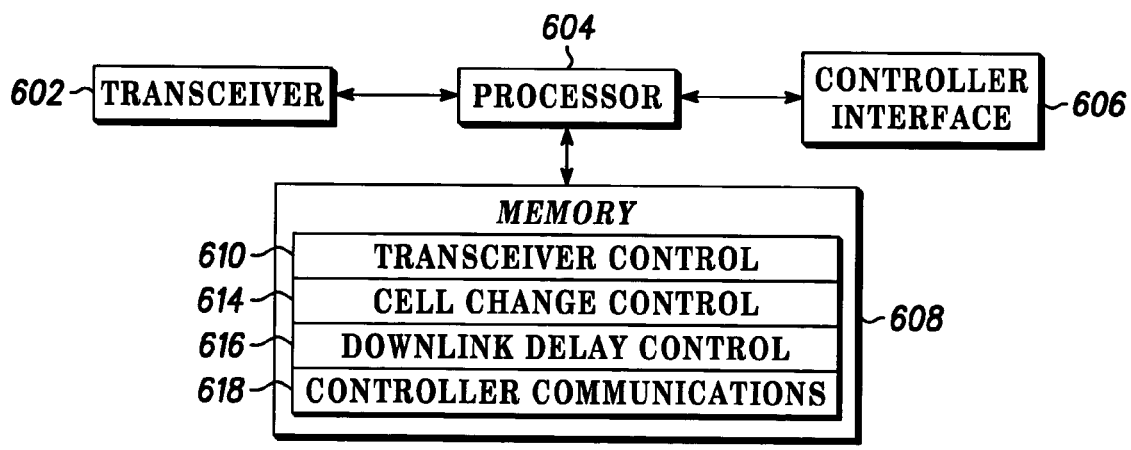
FIG. 6 is an exemplary electrical block diagram of a base station (BS) in accordance with the present invention.

FIG. 6 is an exemplary electrical block diagram of the BS 402 in accordance with other embodiments, comprising a conventional transceiver 602, such as the transceiver utilized in the GPRS base stations readily available from Motorola, Inc. and others. The transceiver 602 is coupled to a conventional processor 604, such as a processor of the MC68000 family of processors available from Motorola, Inc., for controlling the transceiver 602. The BS 402 further comprises a controller interface 606, e.g., a conventional communications port, for interfacing with the controller 410.

In addition, the BS 402 includes a conventional memory 608 coupled to the processor 604 and including executable software programs for programming the processor 604 in accordance with the present invention. The memory 608 comprises a conventional transceiver control program 610 for programming the processor 604 to control the transceiver 602 according to the protocol utilized in the wireless communication system 400. The memory 608 also includes a conventional cell change control program 614 for programming the processor 604 to cooperate with the MS 404 to execute a cell change when needed. In addition, the memory 608 includes a downlink delay control program 616 for programming the processor 604 to add delay to the downlink transmission path to progressively increase the round trip time for a plurality of data segments sent just prior to the cell change to prevent a spurious retransmission from resulting from the cell change, in accordance with the present invention. It will be appreciated that an equally effective technique for increasing the round trip time can be for the base station 402 to add delay to the uplink transmission path, instead. The memory 608 further comprises a conventional controller communications program 618 for programming the processor 604 to cooperate with the controller interface 606 to handle communications with the controller 410 through well-known techniques.

Thus, it should be clear from the preceding disclosure that the present invention provides a method and apparatus for preventing a spurious retransmission after a planned interruption of communications, such as a hard cell change. The method and apparatus advantageously can be implemented in systems that utilize the Transmission Control Protocol (TCP) and other protocols that similarly calculate a retransmission timeout, without requiring any change in the protocol standards.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method in a wireless communication system employing a communication protocol in which a retransmission timeout value is calculated by a sender from a round-trip time, the method for preventing a spurious retransmission during a planned interruption of communications, the method comprising:

determining whether the planned interruption is about to occur; and in response to determining that the planned interruption is about to occur, progressively increasing the round-trip time for each data segment in a plurality of successive data segments sent before the planned interruption occurs, such that the retransmission timeout value calculated from the progressively increasing round-trip time becomes larger than a time required to complete the planned interruption, thereby preventing the spurious retransmission.

2. The method of claim 1, wherein progressively increasing the round-trip time comprises increasing the round-trip time for each data segment of the plurality of successive data segments by an amount insufficient to exceed the retransmission timeout value when the data segment is sent.

3. The method of claim 1,
   wherein the communication protocol is a self clocking protocol, and wherein progressively increasing the round-trip time comprises adding a delay in only one direction of a two-way communication channel.

4. The method of claim 1,
wherein the communication protocol is Transmission Control Protocol (TCP), and
wherein the method further comprises progressively increasing the round-trip time for each data segment of the plurality of successive data segments by about 400 milliseconds more than that of an immediately previous segment.

5. The method of claim 1,
wherein the planned interruption of communications is caused by a break-before-make handoff of a mobile station from a first cell to a second cell.

6. A mobile station in a wireless communication system employing a communication protocol in which a retransmission timeout value is calculated by a sender from a round-trip time, the mobile station for preventing a spurious retransmission during a planned interruption of communications, the mobile station comprising:
a transceiver for communicating with a fixed portion of the wireless communication system; and
a processor coupled to the transceiver for controlling the mobile station,
wherein the processor is programmed to:
cooperate with the transceiver to determine whether the planned interruption is about to occur; and
in response to determining that the planned interruption is about to occur, progressively increase the round-trip time for each data segment in a plurality of successive data segments sent before the planned interruption occurs, such that the retransmission timeout value calculated from the progressively increasing round-trip time becomes larger than a time required to complete the planned interruption, thereby preventing the spurious retransmission.

7. The mobile station of claim 6, wherein the processor is further programmed to increase the round-trip time for each data segment of the plurality of successive data segments by an amount insufficient to exceed the retransmission timeout value when the data segment is sent.

8. The mobile station of claim 6,
wherein the communication protocol is a self-clocking protocol, and
wherein the processor is further programmed to add a delay in only one direction of a two-way communication channel.

9. The mobile station of claim 6,
wherein the communication protocol is Transmission Control Protocol (TCP), and
wherein the processor is further programmed to progressively increase the round-trip time for each data segment of the plurality of successive data segments by about 400 milliseconds more than that of an immediately previous segment.

10. The mobile station of claim 6,
wherein the planned interruption of communications is caused by a break-before-make handoff of the mobile station from a first cell to a second cell.

11. A base station in a wireless communication system employing a communication protocol in which a retransmission timeout value is calculated by a sender from a round-trip time, the base station for preventing a spurious retransmission during a planned interruption of communications, the base station comprising:
a transceiver for communicating with a mobile station; and
a processor coupled to the transceiver for controlling the base station,
wherein the processor is programmed to:
cooperate with the transceiver to determine whether the planned interruption is about to occur; and
in response to determining that the planned interruption is about to occur, progressively increase the round-trip time for each data segment in a plurality of successive data segments sent before the planned interruption occurs, such that the retransmission timeout value calculated from the progressively increasing round-trip time becomes larger than a time required to complete the planned interruption, thereby preventing the spurious retransmission.

12. The base station of claim 11, wherein the processor is further programmed to increase the round-trip time for each data segment of the plurality of successive data segments by an amount insufficient to exceed the retransmission timeout value when the data segment is sent.

13. The base station of claim 11,
wherein the communication protocol is a self clocking protocol, and
wherein the processor is further programmed to add a delay in only one direction of a two-way communication channel.

14. The base station of claim 11,
wherein the communication protocol is Transmission Control Protocol (TCP), and
wherein the processor is further programmed to progressively increase the round-trip time for each data segment of the plurality of successive data segments by about 400 milliseconds more than that of an immediately previous segment.

15. The base station of claim 11,
wherein the planned interruption of communications is caused by a break-before-make handoff of the mobile station from a first cell to a second cell.

16. A wireless communication system employing a communication protocol in which a retransmission timeout value is calculated by a sender from a round-trip time, the wireless communication system for preventing a spurious retransmission during a planned interruption of communications, the wireless communication system comprising:
a mobile station for communicating with a fixed portion of the wireless communication system; and
at least two base stations for communicating with the mobile station,
wherein the mobile station is arranged and programmed to:
determine whether the planned interruption is about to occur; and
in response to determining that the planned interruption is about to occur, progressively increase the round-trip time for each data segment in a plurality of successive data segments sent before the planned interruption occurs, such that the retransmission timeout value calculated from the progressively increasing round-trip time becomes larger than a time required to complete the planned interruption, thereby preventing the spurious retransmission.

17. The wireless communication system of claim 16, wherein the mobile station is further arranged and programmed to increase the round-trip time for each data segment of the plurality of successive data segments by an amount insufficient to exceed the retransmission timeout value when the data segment is sent.

18. The wireless communication system of claim 16, wherein the communication protocol is a self clocking protocol, and wherein the mobile station is farther arranged and programmed to add a delay in only one direction of a two-way communication channel.

19. The wireless communication system of claim 16, wherein the communication protocol is Transmission Control Protocol (TCP), and wherein the mobile station is farther arranged and programmed to progressively increase the round-trip time for each data segment of the plurality of successive data segments by about 400 milliseconds more than that of an immediately previous segment.

20. The wireless communication system of claim 16, wherein the planned interruption of communications is caused by a break-before-make handoff of the mobile station from a first cell to a second cell.

* * * * *